Patented Aug. 24, 1954

2,687,375

UNITED STATES PATENT OFFICE 2,687,375

DRILLING FLUIDS

Paul W. Fischer, Long Beach, and Raymond A. Rogers, Wilmington, Calif., assignors to Union Oil Company of California, Los Angeles, Calif., a corporation of California No Drawing. Application October 1, 1949,
Serial No. 119,196

11 Claims. (Cl. 252—8.5)

This invention relates to fluids employed in the drilling of oil, gas and other wells and to methods for drilling wells employing such fluids. The invention more particularly relates to fluids known as drilling muds which are employed in the drilling of wells with rotary drilling tools, and which drilling muds contain added agents to impart desirable physical characteristics and to simultaneously treat the producing formation to provide an increased initial petroleum production rate.

This application is a continuation-in-part of copending application Serial Number 686,726 filed July 27, 1946, now Patent No. 2,518,439, copending application Serial Number 720,304 filed January 4, 1947, and copending application Serial Number 787,858 filed November 24, 1947, by the present inventors.

In drilling an oil, gas or water well by means of rotary drilling tools, hollow drill pipe or drill stem with a rotary bit attached to the lower end is used. The drill pipe and bit are rotated to drill out the borehole. A fluid commonly termed a drilling mud is circulated downwardly through the hollow drill stem and bit to the bottom of the borehole and then upwardly to the surface through the annular space between the drill stem and the face of the borehole. The drilling mud in general comprises a suspension of solid material in a liquid medium such as water and may contain other added agents. The drilling mud serves to lubricate and cool the drill bit, suspend and carry cuttings out of the borehole, plaster the face of the borehole with a thin impervious layer of solid material to prevent flow of fluids into or out of the formation, apply a hydrostatic pressure to the formation to counterbalance the pressure of liquids or gases sometimes present there, and fulfill other requirements.

In order for the drilling fluid to perform the above functions it must have certain desirable physical properties. The fluid must have a viscosity of such a magnitude that it is conveniently pumpable without undue pressure differentials. It must be sufficiently thixotropic so that cuttings will remain suspended in the borehole should circulation of the mud be stopped for any reason, and in addition readily release the cuttings from suspension when the fluid is agitated as in the settling pits. It must further form a thin impervious filter cake on the borehole face to prevent the loss of the liquid medium present in the drilling mud by filtration into the formations through which the borehole passes. Such a filter cake effectively seals the face of the borehole and inhibits any tendencies toward sloughing, heaving or cave-in of rock into the borehole. The fluid must be further capable of suspending weighting agents such as inorganic compounds having high specific gravities, such as compounds of the heavy metals, so that a pressure substantially greater than the hydrostatic pressure of a column of water of equal depth may be applied when necessary to the formation. The fluid should also be of such a constitution that the presence of granular material, such as cuttings formed in drilling the borehole and which may be assimilated or dissolved by the drilling mud has substantially no effect on the physical properties of the drilling fluid.

One physical characteristic of a drilling mud which is of considerable importance is its ability to form a thin impervious cake on the walls or the face of the borehole to seal this surface against fluid flow therethrough. This property may also be termed the cake-forming, water loss, sealing, or filtration characteristic. A measure of the ability of a drilling mud to form such a thin impervious layer may be obtained by means of a simple filtration test in which the mud cake is formed and pressed against the membrane or filter which is permeable to water. A standardized procedure for determining the filtration rate is described in "Recommended Practice on Field Procedure for Testing Drilling Fluids, A. P. I. Code No. 29, Second Edition" published July 1942 beginning on page 11. The test briefly comprises measuring the total volume of filtrate water obtained during a given time interval of pressure filtration. The best procedure for determining the filtration rate is to measure the filtrate volume obtained during the first hour of the test, although the volume of filtrate obtained during the first five minutes or the first fifteen minutes of filtration may be employed as an indication of the filtration rate. Numerous correlations of such filtration rate determinations with actual drilling experience with the same drilling muds have indicated that fluid yielding a total filtrate in excess of about 45 ml. during the first hour may be dangerous to use and that drilling muds yielding less than about 30 ml. during the first hour under the same testing conditions are generally very satisfactory.

Another important characteristic of drilling muds is their viscosity which should be of such a magnitude that the fluid may be readily and easily circulated by pumping such as is ordinarily employed during drilling operations. A standardized procedure is generally used in which a Marsh funnel viscosimeter is employed. The time required for a given volume of drilling mud to pass through the funnel is determined and taken as an indication of the viscosity or pumpability. This test may be conducted by measuring 1500 ml. of drilling fluid into the funnel and measuring the time required for 1000 ml. to run out, or by measuring 500 ml. in and allowing that quantity to run out. The viscosity thus determined is given in terms of time in seconds. The standardized procedure for the determination of the Marsh viscosity, apparent viscosity or funnel viscosity, as they may be termed, may be found in "Recommended Practice on Standard Field Procedure for Testing Drilling Fluids, A. P. I. Code No. 29, Second Edition" published July 1942, page 6.

Oil-producing formations are believed to be porous layers containing sand and having varying degrees of permeability to the flow of fluids such as oil, water, or gas. Consequently, the rate of oil production from an oil well is largely determined by the rate of flow of oil through these permeable formations which in turn is dependent upon the porosity or permeability of the sand or stone present. In drilling through such a porous layer it has been considered necessary to employ a drilling mud having such characteristics that liquids or solids were prevented from penetrating the porous producing formation since undesirable effects were believed to result from such penetration. In employing water base drilling muds, the porous formation was assumed to become wet by water causing the production rate of the wells to be less than if the formation was preferentially wet by oil. Further, some porous oil-bearing formations contain argillaceous materials, such as in certain California oil fields, which are caused to swell when contacted by water thus filling the interstices of the porous formation and decreasing the permeability to oil flow. The use of drilling fluids containing substantial quantities of saline constituents, such as concentrated or even saturated solutions of sodium chloride have been previously used in an effort to inhibit the decrease in oil production rate caused by wetting the formation with water and decreasing the permeability of the porous rock through contact with water. Such drilling fluids offer severe disadvantages to the employment of electric logging since the presence of large quantities of electrolytes render the electric log obtained of substantially no value.

Considerable work has been done attempting to develop additive agents for drilling fluids which impart desirable filtration rate, viscosity, and other physical characteristics thereto. The presence of quantities of dissolved salts in the drilling fluid, which may arise from the saline constituents of connate water or from considerable addition to the drilling fluid cause a partially complete or complete flocculation of colloidal particles suspended in the drilling fluid. This flocculation results in an immediate viscosity increase and a filtration rate increase which may, depending upon the quantity of salts present, render the drilling fluid inoperable. Since the addition of salts such as sodium chloride to drilling fluids is known to be of benefit, search for addition agents to counteract the increase in viscosity and filtration rate has resulted in the proposal of the addition of such materials as alginates, glues such as casein and casein derivatives and other mucilaginous materials which tend to restore the viscosity and the filtration rate in the presence of saline materials to within desirable limits. Starch has been found particularly valuable for this purpose but is however, susceptible to bacterial action which may result in excessive starch fermentation causing the drilling fluid to become gas-cut and unsuitable.

The present invention, therefore, is directed to the production of drilling fluids which may contain dissolved saline materials formed from the reaction of an alkali metal or an alkaline earth metal with a strong mineral acid, and which further contain at least one of a special class of additive agents which is free of the disadvantages encountered with materials previously added to restore the physical properties of a drilling mud.

It is therefore one of the primary objects of this invention to provide for the treatment of a drilling mud which will impart a filtration rate of less than about 45 ml. and at most not more than 55 ml. per hour and a viscosity which is sufficiently low to permit convenient handling of the drilling mud in oil and gas well drilling.

It is another object of this invention to provide a treatment for drilling muds containing water-soluble salts, such as those containing an alkali metal ion or an alkaline earth metal ion and an anion of a strong mineral acid, which treatment causes the drilling mud to have a filtration rate of less than about 45 ml. per hour and an operable viscosity.

It is another object of this invention to provide a drilling mud containing added water-soluble salts together with a protective colloid material, which drilling mud is substantially stable and free from bacterial action.

It is a still further object of this invention to provide a drilling mud containing an alkyl or hydroxy alkyl cellulose which is more resistant to bacterial action than drilling muds containing the starches or gums previously disclosed and which remains stably dispersed in aqueous media at the elevated temperatures encountered in well drilling operations. The term alkyl or hydroxy alkyl cellulose is used herein its common sense, i. e., to designate materials which are actually alkyl or hydroxy alkyl ethers of cellulose. Thus the material commonly referred to as ethyl cellulose is actually ethoxy cellulose, and hydroxyethyl cellulose is actually hydroxyethoxy cellulose. Usually the alkyl and hydroxy alkyl celluloses contain more than one alkyl or hydroxy alkyl substituent group per glucoside ring of the cellulose structure.

It is still another object of this invention to improve the productivity of oil wells through the use of a drilling fluid containing water-soluble salts, which drilling fluid loses to productive formations a filtrate which tends to increase the effective permeability of the formation and thus increase the potential production rate.

It is a more specific object of the present invention to provide a treatment for drilling muds which comprises the addition of a water-soluble salt to assist in the treatment of production zones through which the well is drilled and sufficient quantities of an alkyl or hydroxy alkyl cellulose to control the viscosity and filtration rate properties of the mud without deleteriously altering its cake forming property or its desirability as a drilling fluid.

It is an additional object of this invention to provide a drilling fluid containing an alkyl or hydroxy alkyl cellulose and a soap of a high molecular weight carboxylic acid or an oil-soluble sulfonic acid.

It is an additional object of this invention to provide a method for drilling oil and gas wells which employs the drilling fluid described herein and which aids in the completion of wells having improved productivities.

Other objects and advantages of this invention will become apparent to those skilled in the art as the description thereof proceeds.

Briefly, the present invention comprises a water base drilling fluid containing suspended colloidal solids such as bentonite or other suitable clay and to which fluid has been added a protective colloid and a water-soluble salt. The water-soluble salt may contain monovalent, divalent or polyvalent metal ions and preferably comprises a salt prepared by the reaction of an alkali metal or an alkaline earth metal with a strong mineral acid. The solution of such a metal salt, particularly the divalent metal salts, liberates ions in the drilling fluid which have been found to exert beneficial effects on porous formations such as oil sands. The protective colloid of the present invention preferably comprises an alkyl or hydroxy alkyl cellulose of the type hereinafter more fully described with or without supplemental addition agents such as alkali metal soaps of relatively high molecular weight organic acids which serve to regulate the viscosity and filtration rate characteristics of the drilling fluid to form a drilling mud which is highly desirable in the drilling of oil or gas wells. The drilling muds of this invention may further contain suitable weighting agents which are employed to increase the densities of the fluid. Although the protective colloids preferred in this invention are unusually stable toward bacterial action, bactericides or germicides may be added if desirable in specific instances. This invention further comprises a method of drilling oil and gas wells employing the drilling fluids of this invention as hereinafter more fully described.

Oil-bearing strata in general comprise porous sand structures many of which contain argillaceous materials such as bentonitic clays which exhibit marked volume changes depending upon the composition of the connate water present in the formation. This is believed to be due to the presence of salts in such argillaceous materials which, when contacted with water or salt solutions, exert strong osmotic forces tending to swell the clays. It is believed that many of these clays present in oil sand, particularly California oil sands, are predominantly sodium clays and it is known that the volume of such clays markedly increases when the clays are contacted by fresh water. Such is the case when a drilling fluid loses fresh water by filtration through the borehole face. Certain types of shales known as heaving shales are extraordinarily susceptible to the swelling under the influence of such filtrates lost from drilling fluids in which case the shale sloughs off material into the borehole and sometimes results in abandonment of the bore.

It has been found that the divalent metal ion clays are of considerably less volume than the sodium clays and that these clays are apparently of the base exchange type. Hence when these clays are contacted by the filtrate of the drilling muds of this invention which contain divalent metal ions a permeability increase of the porous formation is effected and a higher fluid (oil) flow rate may be obtained from oil-producing formations so treated. It is apparent, but not definitely established, that the mechanism above described is that which is responsible for the effects noted in employed the drilling fluids of the present invention. Since this mechanism has not been definitely established it is preferred that this explanation be not used to limit this invention.

The water-soluble salts present in the drilling muds of the present invention preferably comprise divalent or polyvalent metal ion salts such as chlorides, nitrates, sulfates, and the like of metals above iron in the electromotive series. Divalent metals which are suitable include strontium, barium, calcium, magnesium, beryllium, manganese, zinc, and the like, and may be employed to effect the desired results. Polyvalent metals which are also suitable include aluminum, iron and chromium. The preferred divalent metal ion is calcium, which is in general most conveniently incorporated as the water-soluble chloride, although other calcium salts may be employed.

Desirable drilling muds may be prepared using the additive agents, such as the present class of cellulose derivatives with or without the alkali metal salts of the specified classes of organic acids, in conventional water base muds. Drilling muds having desirable properties are also obtainable by employing the above mentioned additive agents in "salt-base" muds which contain water-soluble monovalent metal salts. The alkali metal salts including the chlorides, sulfates, and other salts of lithium, sodium and potassium may be used. Sodium chloride added to a methyl cellulose mud, for example, results in a drilling mud possessing highly desirable properties.

The incorporation of saline materials such as calcium chloride or other divalent metal water-soluble inorganic salts above defined results in the shrinkage or flocculation of colloidal clays present in the formation through which the oil or gas well is drilled, such divalent metal ions being introduced thereinto and dissolved in the filtrate water lost from the drilling fluid during drilling. Simultaneously, the colloidal clay which, for example, may comprise bentonite is also partially or completely flocculated depending upon the amount and the nature of soluble salt added. Such flocculation of the colloidal clay contained in the drilling fluid causes the viscosity and the water loss rate to increase and a mixture results which has a strong tendency to settle on standing. It has been found that the addition of an alkyl or hydroxy alkyl cellulose which is soluble or dispersible in water and exemplified by ethyl or hydroxy ethyl cellulose constitutes an unusually desirable agent which has the effect of restoring the viscosity and filtration rate properties of a drilling mud containing added salts to values within desirable limits prescribed above. Ethyl and hydroxy ethyl cellulose are the preferred agents to accomplish these remedial effects, although other low molecular weight alkyl or hydroxy alkyl celluloses such as propyl and hydroxy propyl cellulose are applicable. The alkyl and hydroxy alkyl celluloses in which the alkyl or hydroxy akyl substituent groups each contain at least 2 carbon atoms are preferred to methyl cellulose since they are more stable at the high temperatures, e. g., 180° F. or higher, encountered in many drilling operations. Thus they have a much better ability to stay in solution or dispersion in the mud, and retain their beneficial effects on the mud throughout the drilling operation. It has been found that only a small amount of the water-soluble alkyl or hydroxy alkyl celluloses of the present class is required to restore the physical properties of the drilling mud and that an unusually desirable drilling fluid is thus formed.

The quantity of water-soluble inorganic metal salt incorporated in a drilling mud to form the improved drilling fluid of this invention may vary from as low as about 0.01% by weight to as high as about 5.0% by weight, although it is preferred that this salt content be maintained between about 0.5% and about 1.25% by weight. In some cases as high as about 10% by weight of added salt may be employed. In some instances quantities of added salt in the range of from as low 0.01% to about 0.5% is sufficient to effect the permeability increase desirable in productive formations.

The quantity of alkyl or hydroxy alkyl cellulose employed in the drilling muds of this invention is variable from as low as about 0.01% by weight to about 3.0% by weight, and sometimes as high as about 5% or 10% by weight may advantageously be employed. It is preferable, however, that between about 0.5% and about 0.8% by weight of the water dispersible cellulose derivative be employed.

The preferred water dispersible alkyl or hydroxy alkyl celluloses employed in the practice of this invention comprise commercially available ethyl cellulose and hydroxy ethyl cellulose marketed in a variety of viscosity grades. A rather wide range of viscosity effects may be obtained by incorporating various quantities of the various grades of the alkyl or hydroxy alkyl cellulose in the drilling fluid. The most desirable ethyl cellulose has been found to be the grade labeled 400 cps., that is to say, a 2.0% dispersion of this material in water has a viscosity of 400 centipoises. Dissolution of these ethyl celluloses and the hydroxy ethyl celluloses in water forms clear, viscous, suspended solid-free liquids, the viscosities of which are dependent upon the concentration and the grade of the alkyl or hydroxy alkyl cellulose employed.

The ethyl celluloses preferred as treating agents in the present invention may be prepared by dissolving or splitting the cellulose by repeatedly treating one mole of cellulose with 2.5 mols of caustic soda in water and alkylating the product with 3.0 mols of ethyl sulfate until analysis shows an ethoxy content of at least 20% by weight. Caustic soda solutions of 20% by weight concentration are first used to treat the cellulose followed by a maceration step to accomplish the splitting and solution, which in turn is followed up by addition of the ethyl sulfate as the alkylating agent. Similarly, the hydroxy ethyl cellulose may be prepared by alkylating solutions of cellulose in sodium hydroxide, quaternary ammonium hydroxide or other bases or splitting agents. Other alkylating agents including alkyl halides may be employed such as methyl iodide. The ethyl and similar low molecular weight alkyl or hydroxy alkyl celluloses which are readily water dispersible are applicable to the preparation of the drilling fluids of this invention.

These alkyl cellulose derivatives are radically different from those previously proposed for the preparation of drilling fluids wherein other cellulose derivatives are incorporated. Cellulose-containing drilling muds have previously been prepared by the dissolution of celluloses prepared from wood or as cotton or cotton linters in concentrated solutions of a divalent metal salt such as zinc chloride or other aqueous solution capable of dissolving cellulose. Drilling muds containing cellulose thus prepared are readily decomposable by the addition of acids, by heating and by other means since the cellulose is present in a regeneratable form. Drilling fluids thus prepared are entirely different from the drilling fluids of the present invention since the cellulose is present in an entirely different form and has different effects upon the drilling fluid. The alkyl and hydroxy alkyl celluloses employed in drilling fluids of the present invention are not regeneratable and they are not decomposable in the presence of salts or acids or by heating.

It has also been proposed to employ alkali metal carboxy methyl celluloses in drilling muds. It is desired here to point out that the alkyl and hydroxy alkyl cellulose derivatives employed in drilling muds of the present invention are readily distinguishable over drilling muds containing such alkali metal carboxy methyl cellulose derivatives. According to the manufacturer of such materials, sodium carboxymethyl cellulose, for example, has only limited solubility in the presence of the alkaline earth metal salts which comprise the preferred saline addition agents in the drilling fluids of the present invention. Sodium carboxymethyl cellulose further forms insoluble salts of cellulose glycolic acid with such divalent and polyvalent metals such as zinc, cooper, aluminum, tin, silver, chromium, iron and titanium.

Some of the divalent metal ions mentioned above are found in the connate waters present in porous formations through which wells may be drilled. The presence of such metal ions in contact with a drilling fluid prepared from an alkali metal carboxy metal cellulose has pronounced deleterious effects upon the physical properties of such drilling fluids; whereas, the presence of these metal ions in contact with the drilling fluids according to this invention which contain an alkyl or hydroxy alkyl cellulose derivative, actually improves the drilling mud as indicated by the change in such physical properties as the filtration rate and the Marsh viscosity.

The filtration rate of the drilling fluids of this invention is almost completely controlled by the concentration of the alkyl or hydroxy alkyl cellulose present and relatively little effect has been observed by the variation in the source of the clay employed in preparing the mud. Variation in the mud densities between about 66 to as high as about 78 pounds per cubic foot and the variation in salt content to in excess of about 5.0% by weight also have relatively little effect on the filtration rate. It has also been found that the use of the present water-dispersible alkyl and hydroxy alkyl celluloses need not be necessarily restricted to incorporation in drilling fluids containing dissolved salts, and that these soluble cellulose derivatives may also be used to control the water loss characteristics of the more conventional water base drilling fluids.

In the practice of this invention in the field, the treating agents may be conveniently added to the circulating mud stream at a point adjacent to the mud pump suction inlet in the mud sump. Thorough admixture of the thus introduced treating agents may be assured by rapid recirculation of the mud from the mud sump through a spare slush pump. During treatment, mud samples may be taken from the circulating mud stream at frequent intervals and tested in order to determine when the desired degree of treatment has been effected.

The following examples will illustrate a number of ways in which the principle of the invention may be applied but are not to be construed as limiting the same.

Example I

Approximately 525 parts by weight of Rogers Lake clay was stirred into 1350 parts by weight of water. Stirring was continued for about 20 minutes to insure complete hydration of the clay, after which there was then added 18 parts by weight of hydroxyethyl cellulose. The latter product was a commercial material sold under the trade name "Cellosize" and comprised 98 per cent hydroxyethyl cellulose. Finally 30 parts by weight of solid calcium chloride dihydrate was stirred into the mixture. The composition so obtained was a stable suspension having an A. P. I. funnel viscosity of 40 seconds (500 ml. sample) and a 15-minute filtration rate value of 4.8 at 80° F. After storage for 14 days at 160° F., the composition had a viscosity of 34 seconds (500 ml. sample) and a 15-minute filtration rate value of 12.2. Such a degree of stability upon storage at elevated temperatures is characteristic of the alkyl and hydroxyalkyl cellulose in which the alkyl and hydroxyalkyl substituents contain 2 or more carbon atoms.

Example II

To the composition obtained in Example I there was added 24 parts by weight of quebracho. The resulting composition had an A. P. I. funnel viscosity of 47 seconds (500 ml. sample) and a 15-minute filtration rate value of 4.5 at 80° F. After 14 days storage at 160° F. the composition had a viscosity of 39 seconds and a 15-minute filtration rate value of 4.7.

The following composition was prepared employing the procedure of Example I:

| | Parts by weight |
|---|---|
| Rogers Lake clay | 525 |
| Water | 1350 |
| Hydroxyethyl cellulose | 18 |

This composition had an A. P. I. funnel viscosity of 98 seconds (500 ml. sample) and a 15-minute filtration rate value of 4.5 at 80° F. It is typical of the salt-free drilling fluids of the present invention.

Example III

Sufficient Santa Maria Valley clay was dispersed in water to produce a mud having a density of 74 lbs./cu. ft. To 100 parts by weight of this mud there was then added 1.5 parts by weight of calcium chloride and 1.5 parts by weight of water-soluble ethyl cellulose. The resulting composition had an A. P. I. funnel viscosity of 40 seconds (500 ml. sample) and a 15-minute filtration rate value of 4.0 at 80° F.

The viscosity determination used to measure the viscosity of drilling muds in the above examples was a variation of that which is described in the A. P. I. code referred to previously. In the preparation of experimental drilling fluids it is often convenient to prepare a quantity which is less than the 1500 ml. sample required for performing the viscosity analysis as therein described, and consequently this modification was employed. The Marsh viscosimeter which comprises a funnel was, however, employed as prescribed in the A. P. I. code. A similar situation arises in the testing of these experimental muds to determine their filtration rate characteristics. The A. P. I. code prescribes running the filtration rate for a period of one hour under a pressure of 100 pounds per square inch. However, it has been found convenient to measure the filtrate accumulated after periods of 5 and 15 minutes. The quantity of filtrate thus obtained bears a very simple relationship to that obtained during an hour's filtration test, in that the mud having a filtration rate of about 45 ml. per hour yields about 11 ml. in the first five minutes and about 22 ml. in the first 15 minutes of filtration. Similarly, a mud which yields the total filtrate of about 30 ml. per hour will yield about 7 ml. of filtrate in the first five minutes and about 15 ml. of filtrate in the first 15 minutes of filtration. The correlation between the 5 minutes and 15 minutes observations with that of the one hour filtration test is at once obvious.

It has also been found that drilling muds can be treated with the alkyl or hydroxyalkyl cellulose derivatives of the present class with or without the addition of other reagents which will control both the viscosity and the filtration rate of the mud. Drilling muds which are beneficially effected by the addition agents herein described include those which may be or have been contaminated during drilling. It is possible to add the reagents to the mud either before or after the contamination has taken place. In those cases where it is known or expected that the mud is going to be contaminated by undesirable materials, such as for example, when it is anticipated that a cement plug will be drilled through and that the mud will then become contaminated with cement, the reagent or reagents can be added to the mud prior to said contamination. This type of treatment immunizes the mud against any substantial deterioration in its performance characteristics upon subsequent admixing with the contaminating material, and in some cases it has been found that such contamination after the addition of the reagents which have now been discovered even improves the performance characteristics of the mud. Furthermore, the alkyl and hydroxyalkyl cellulose derivatives of the present class, with or without other reagents, are so effective in controlling water loss that the viscosity if desired can be controlled merely by the addition of water to the mud either before or after contamination with the cement or similar materials. Illustrative of this point it has been observed that when mud becomes contaminated with cement its viscosity and filtration rate becomes undesirably high, but that these factors can be reduced to desirable values by the addition to the contaminated mud of a mixture of an alkyl cellulose derivative such as an ethyl cellulose and an oil-soluble sulfonic acid soap. On the other hand, by adding the mixture of these materials to the mud prior to contamination with cement, the performance characteristics of the mud are improved, and upon the subsequent addition of cement the performance characteristics are still acceptable and in many cases may remain substantially unchanged or may even be improved.

It has also been discovered that the performance characteristics of an alkyl or hydroxy alkyl cellulose derivative-containing mud, particularly its water loss properties, it can be controlled by the addition to the mud of between about 0.01% and 10% by weight of the alkali metal and ammonium salts of higher molecular weight carboxylic acids and oil-soluble sulfonic acids of relatively high molecular weight either singly or in admixture with one another as hereinafter more fully described.

By the term "alkali metal" it is meant to include lithium, sodium and potassium.

By the term "basically reacting compound" it is meant to include oxides, hydroxides and other compounds which will react with the acidic products such as higher molecular weight organic acids hereinafter more fully described.

The term "higher molecular weight carboxylic acids" is meant to include both cyclic and straight chain organic acids having more than about 10 carbon atoms per molecule, such as for example, oleic acid, palmitic acid, linoleic acid, etc. It is also meant to include those other carboxylic acids having more than about 10 carbon atoms and closely related to the fatty acids such as, for example, the naphthenic acids and the rosin acids such as abietic acid.

The "sulfonic acids of relatively high molecular weight" employed to prepare the oil-soluble alkali metal and ammonium salts may be those synthetically produced or those obtained from the treatment of petroleum fractions. The latter are formed when lubricating oil fractions or similar petroleum fractions are treated with concentrated or fuming sulfuric acid. The so-called "mahogany acids" dissolve in the oil phase, whereas the so-called "green acids" are the water-soluble organic acids which pass into the sludge. After separation of the sludge the "mahogany acids" which are preferred may be recovered in the form of sodium salts by treatment of the acid-treated oil with sodium hydroxide to produce the sodium sulfonates which are then subsequently removed from the oil solution by extraction with alcohol. The other alkali metal salts and the ammonium salts may be obtained from the above sodium salts by well known processes of metathesis. Commercially available oil-soluble alkali metal salt of higher molecular weight sulfonic acids are frequently available as a concentrate in lubricating oil, comprising about 60% sodium sulfonates and 40% lubricating oil.

Desirably, but not necessarily, the treating agent selected from the group comprising the alkali metal and amonium salts of higher molecular weight carboxylic acids and oil-soluble sulfonic acids, may be dispersed in a petroleum or other hydrocarbon oil such as spray oil, a transformer oil extract produced by Edeleanu extraction of a suitable petroleum distillate with sulfur dioxide, a light lubricating oil or even a heavy lubricating oil, prior to introduction into the drilling fluid. Oils of intermediate degree of volatility, such as spray oil, kerosene, or gas oil, or selective solvent extracts from these, have an additional beneficial effect of reducing the foaming tendency of the mud. The amount used is preferably between about 1% and 10% by weight of the finished mud, but smaller amounts down to 0.4% or less and up to about 25% or more may be used to advantage in many muds.

The following examples illustrate various formulations which the drilling fluids of the invention may comprise, but are not to be construed as limiting the invention:

*Example IV*

| | Parts by weight |
|---|---|
| Santa Maria Valley clay | 500 |
| Water | 1,500 |
| Water-soluble ethyl cellulose | 10 |

*Example V*

| | Parts by weight |
|---|---|
| Santa Maria Valley clay | 425 |
| Water | 1,200 |
| Hydroxyethyl cellulose | 15 |
| Zinc chloride | 15 |

*Example VI*

| | Parts by weight |
|---|---|
| Bentonite | 20 |
| Water | 1,200 |
| Water-soluble ethyl cellulose | 25 |
| Aluminum sulfate | 35 |
| Whiting, to increase density to 78 lbs./cu. ft. | |

*Example VII*

| | Parts by weight |
|---|---|
| Rogers Lake clay | 525 |
| Water | 1,350 |
| Water-soluble ethyl cellulose | 20 |
| Calcium chloride | 30 |
| Sodium sulfonate | 25 |
| Kerosene | 85 |

*Example VIII*

| | Parts by weight |
|---|---|
| Rogers Lake clay | 525 |
| Water | 1,350 |
| Hydroxyethyl cellulose | 55 |
| Sodium sulfonate | 25 |
| Kerosene extract | 100 |

*Example IX*

| | Parts by weight |
|---|---|
| Rogers Lake clay | 200 |
| Water | 1,200 |
| Water-soluble ethyl cellulose | 10 |
| Sodium tall oil soap | 85 |
| Calcium chloride | 45 |

*Example X*

| | Parts by weight |
|---|---|
| Santa Maria Valley clay | 800 |
| Water | 2,100 |
| Water-soluble propyl cellulose | 130 |
| Calcium chloride | 225 |

All of the above compositions have properties and characteristics rendering them highly satisfactory for use as drilling fluids.

The drilling muds of the present invention may have densities in the range of from 62.2 pounds per cubic foot to as high as about 80 pounds per cubic foot. When drilling through formations in which gases or liquid exist under elevated pressures it is sometimes required that a drilling fluid having a density in excess of about 80 pounds per cubic foot be employed to apply a sufficiently high hydrostatic pressure to the high pressure formation to effectively prevent a blowout of gas or liquid from the formation. Under such conditions it is necessary to incorporate suitable weighting agents in the mud to increase the effective density. Such weighting agents in general include insoluble inorganic compounds of the heavy metals such as barium sulfate, barium carbonate, ferric oxide or red pigment, plumbic oxide or litharge, galena, silica, pulverized oyster shells or other inorganic compounds having a high specific gravity. By incorporating such weighting agents as finely divided solids in the improved drilling fluids of this invention, densities as high as about 120 pounds per cubic foot may be obtained.

In drilling fluids which contain materials which are subject to such bacterial action as fermentation, it is sometimes necessary to incorporate various germicides to prevent deterioration of these materials. It is possible to use small amounts of such compounds as cuprous sulfate, mercury salts including mercuric chloride and particularly the mercurous salts such as mercurous iodide, and the like, to inhibit bacterial action on organic constituents present in the drilling mud. Other materials which may be employed to effect a similar result include mono- and dihydric phenols, formaldehyde, and polymers of formaldehyde, and the like.

While the foregoing description of my invention has been made with particular reference to ethyl cellulose or hydroxy ethyl cellulose as the treating agent, other water dispersible alkyl or substituted alkyl celluloses may be used for this purpose. These include those made by reacting non-water dispersible cellulose with other compounds which tend to promote water dispersibility. The latter include low molecular weight substituted halogen containing aliphatic compounds which have not more than three carbon atoms and which contain at least one halogen group and in addition contain a secondary group that ordinarily tends to promote water solubility. These solubilizing groups include alcohols, ethers, aldehydes, ketones, amides and amines.

Other modifications of this invention which would occur to one skilled in the art may be made, and these are to be considered within the scope of the invention as defined in the following claims.

We claim:

1. A drilling fluid which comprises water, a suspended clay, between 0.01% and 10% by weight of a soap selected from the class consisting of the alkali metal and ammonium soaps of carboxylic acids containing more than about ten carbon atoms and oil-soluble sulfonic acids, and between about 0.01% and 10% by weight of a water-soluble hydroxyalkyl cellulose ether in which the hydroxyalkyl substituent groups each contain at least 2 carbon atoms.

2. A drilling fluid according to claim 1 in which the soap is an alkali metal soap of oil-soluble sulfonic acids.

3. A drilling fluid according to claim 1 in which the soap is an alkali metal soap of tall oil.

4. A drilling fluid according to claim 1 which also contains a minor proportion of oil sufficient to reduce the foaming tendency of the drilling fluid.

5. A drilling fluid which comprises water, a suspended clay, between about 0.01% and 10% by weight of water-soluble hydroxyethyl cellulose, between about 0.01% and 10% by weight of an alkali metal soap of oil-soluble sulfonic acids and between about 0.4% and 25% by weight of a hydrocarbon oil.

6. A drilling fluid according to claim 5 in which the hydrocarbon oil is a selective solvent extract of approximately the same volatility as gas oil, spray oil and kerosene.

7. A drilling fluid according to claim 1 which contains between about 0.01% and 5% by weight of the water-soluble hydroxyalkyl cellulose ether, and the water-soluble hydroxyalkyl cellulose ether is a water-soluble hydroxyethyl cellulose ether.

8. A drilling fluid according to claim 2 which contains between about 0.01% and 5% by weight of the water-soluble hydroxyalkyl cellulose ether, and the water-soluble hydroxyalkyl cellulose ether is a water-soluble hydroxyethyl cellulose ether.

9. A drilling fluid according to claim 3 which contains between about 0.01% and 5% by weight of the water-soluble hydroxyalkyl cellulose ether, and the water-soluble hydroxyalkyl cellulose ether is a water-soluble hydroxyethyl cellulose ether.

10. A drilling fluid which comprises water, a suspended clay, between about 0.01% and 10% by weight of water-soluble hydroxyethyl cellulose, between about 0.01% and 10% of an alkali metal soap of tall oil, and between about 0.4% and 25% by weight of a hydrocarbon oil.

11. A drilling fluid according to claim 10 in which the hydrocarbon oil is a selective solvent extract of approximately the same volatility as gas oil, spray oil and kerosene.

References Cited in the file of this patent

UNITED STATES PATENTS

| Number | Name | Date |
|---|---|---|
| 2,209,591 | Barnes | July 30, 1940 |
| 2,216,955 | Moore | Oct. 8, 1940 |
| 2,331,049 | Schindler | Oct. 5, 1943 |
| 2,425,768 | Wagner | Aug. 19, 1947 |
| 2,468,657 | Dyke et al. | Apr. 26, 1949 |
| 2,481,545 | Wagner | Sept. 13, 1949 |
| 2,488,304 | Malott | Nov. 15, 1949 |
| 2,489,521 | Carlson | Nov. 29, 1949 |
| 2,497,398 | Dawson | Feb. 14, 1950 |
| 2,498,301 | Self | Feb. 21, 1950 |
| 2,499,548 | Wagner et al. | Mar. 7, 1950 |
| 2,510,153 | Swinehart | June 6, 1950 |
| 2,550,236 | Fischer et al. | Apr. 24, 1951 |
| 2,570,947 | Himel et al. | Oct. 9, 1951 |

OTHER REFERENCES

Heuser, The Chemistry of Cellulose, pp. 422 and 423, published 1944 by John Wiley and Sons of New York.